(12) United States Patent
Sip

(10) Patent No.: US 8,149,216 B2
(45) Date of Patent: Apr. 3, 2012

(54) ELECTRONIC DEVICE WITH JOYSTICK

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 365 days.

(21) Appl. No.: 12/566,680

(22) Filed: Sep. 25, 2009

(65) Prior Publication Data

US 2011/0043449 A1 Feb. 24, 2011

(30) Foreign Application Priority Data

Aug. 20, 2009 (CN) .......................... 2009 1 0305829

(51) Int. Cl.
*G09G 5/08* (2006.01)
*G06F 3/033* (2006.01)
(52) U.S. Cl. ...................................... 345/161
(58) Field of Classification Search ............ 345/161
See application file for complete search history.

(56) References Cited

U.S. PATENT DOCUMENTS

| | | | | |
|---|---|---|---|---|
| 4,499,895 | A * | 2/1985 | Takayama | 600/148 |
| 6,144,368 | A * | 11/2000 | Ooka et al. | 345/161 |
| 6,445,377 | B1 * | 9/2002 | Shimomura | 345/161 |
| 6,756,557 | B1 * | 6/2004 | Ukai et al. | 219/69.13 |
| 7,252,475 | B2 * | 8/2007 | Tarelin et al. | 415/1 |
| 7,784,974 | B2 * | 8/2010 | Baechtiger et al. | 362/295 |
| 7,804,226 | B2 * | 9/2010 | Asai | 310/328 |
| 8,044,934 | B2 * | 10/2011 | Arai et al. | 345/161 |
| 2008/0100413 | A1 * | 5/2008 | Baechtiger et al. | 338/114 |

* cited by examiner

*Primary Examiner* — Fred Tzeng
(74) *Attorney, Agent, or Firm* — Altis Law Group, Inc.

(57) ABSTRACT

An electronic device with joystick is provided. The joystick includes a receiving space includes a plurality of first conductive elements. The device further includes a plurality of resistors, a chip, and a rotatable post. Each of the first conductive elements is electrically connected to the ground via a resistor. The chip includes a plurality of input pins, and each of the pins is electrically connected to a node between a first conductive element and a resistor. The rotatable post includes a second conductive element. The second conductive element is electrically connected to a direct current power source. When the joystick is rotated, causing the second conductive element to contact with one of the first conductive elements, the voltage of the pin connected to the second conductive element is changed. The chip detects a change of the voltage of the pins and executes corresponding functions according to the detected change.

11 Claims, 9 Drawing Sheets

US 8,149,216 B2

ELECTRONIC DEVICE WITH JOYSTICK

BACKGROUND

1. Technical Field

The present disclosure relates to electronic devices and, particularly, to an electronic device with a joystick.

2. Description of Related Art

With the development of portable electronic devices, such as mobile phones, PDAs, and so on, more and more functions, such as e-mail, word processing and so on are being added. In order to better perform various functions, more keys may be needed to add. However, nowadays those electronic devices having less bulky bodies are more popular. Therefore, in order to make electronic devices having less bulky bodies, using fewer keys and small display panels would be unavoidable.

SUMMARY

An electronic device with a joystick is provided. The electronic device includes a main body, a number of resistors, a chip, and a joystick. The main body defines a hollow receiving space. A number of first conductive elements protrude out from the inner sidewall of the receiving space and extend along the axis of the first receiving space. Each of the first conductive elements has a resistance. Each of the first conductive elements is electrically grounded via one of the number of the resistors. The chip includes a number of input pins. Each of the pins is electrically connected to a node between a first conductive element and a resistor connected to the first conductive element. The joystick includes a rotatable post received in the receiving space. A second conductive element protrudes out from the sidewall of the rotatable post and extends along the axis of the rotatable post. The second conductive element is electrically connected to a direct current power source. When the joystick is rotated, causing the second conductive element to contact with a portion of one of the first conductive elements, a voltage value of the pin connected to the second conductive element is changed. The chip detects a change of the voltage value of the pins and executes corresponding functions according to the detected change of the voltage value of the pins.

Other advantages and novel features will be drawn from the following detailed description of the embodiments with reference to the attached drawings.

BRIEF DESCRIPTION OF THE DRAWINGS

The components of the drawings are not necessarily drawn to scale, the emphasis instead being placed upon clearly illustrating the principles of the electronic device with a joystick. Moreover, in the drawings, like reference numerals designate corresponding parts throughout several views.

DETAILED DESCRIPTION

Figure 1:
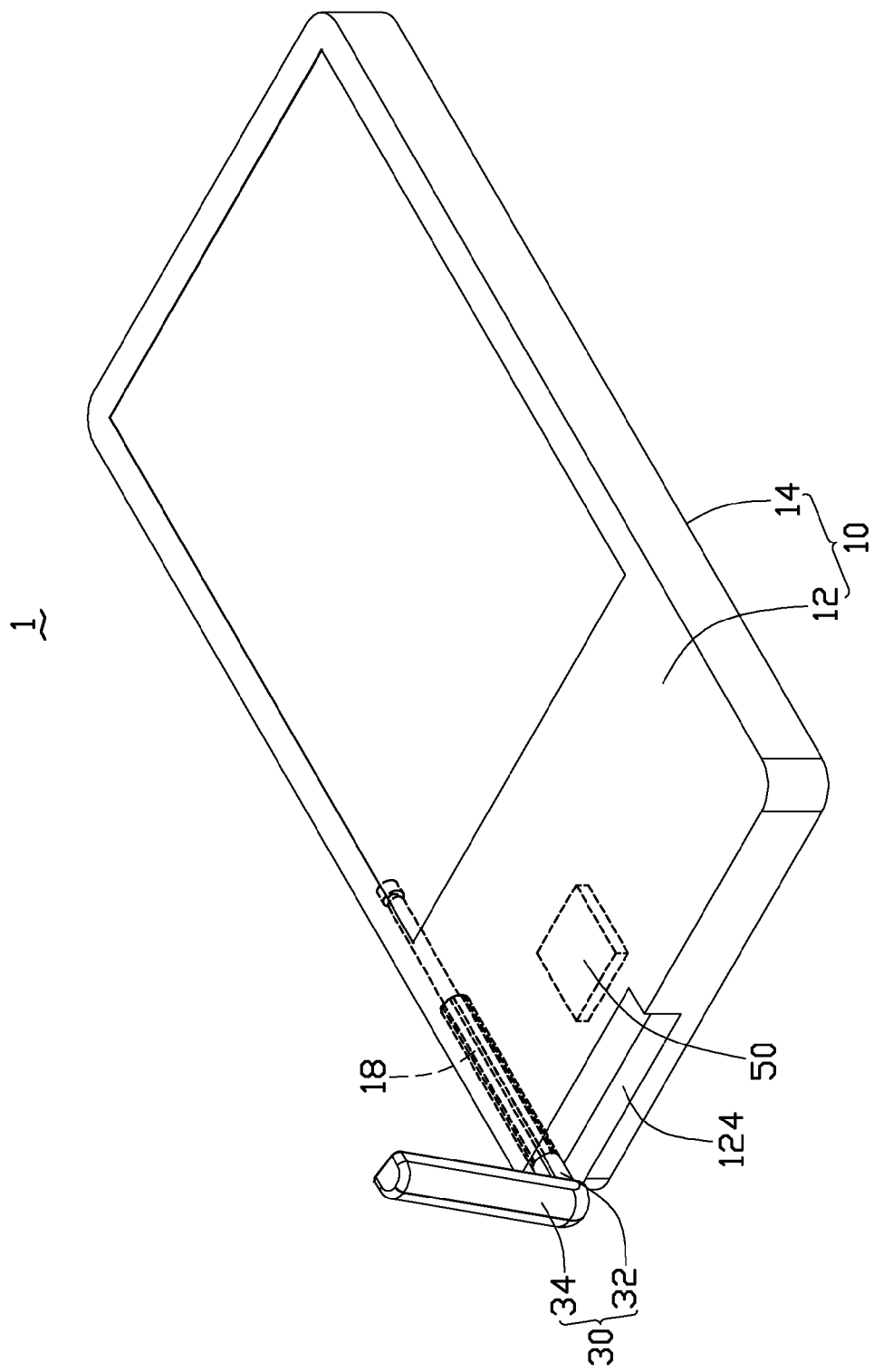
FIG. 1 is an isometric view of the electronic device with a joystick in accordance with an exemplary embodiment.
Figure 2:
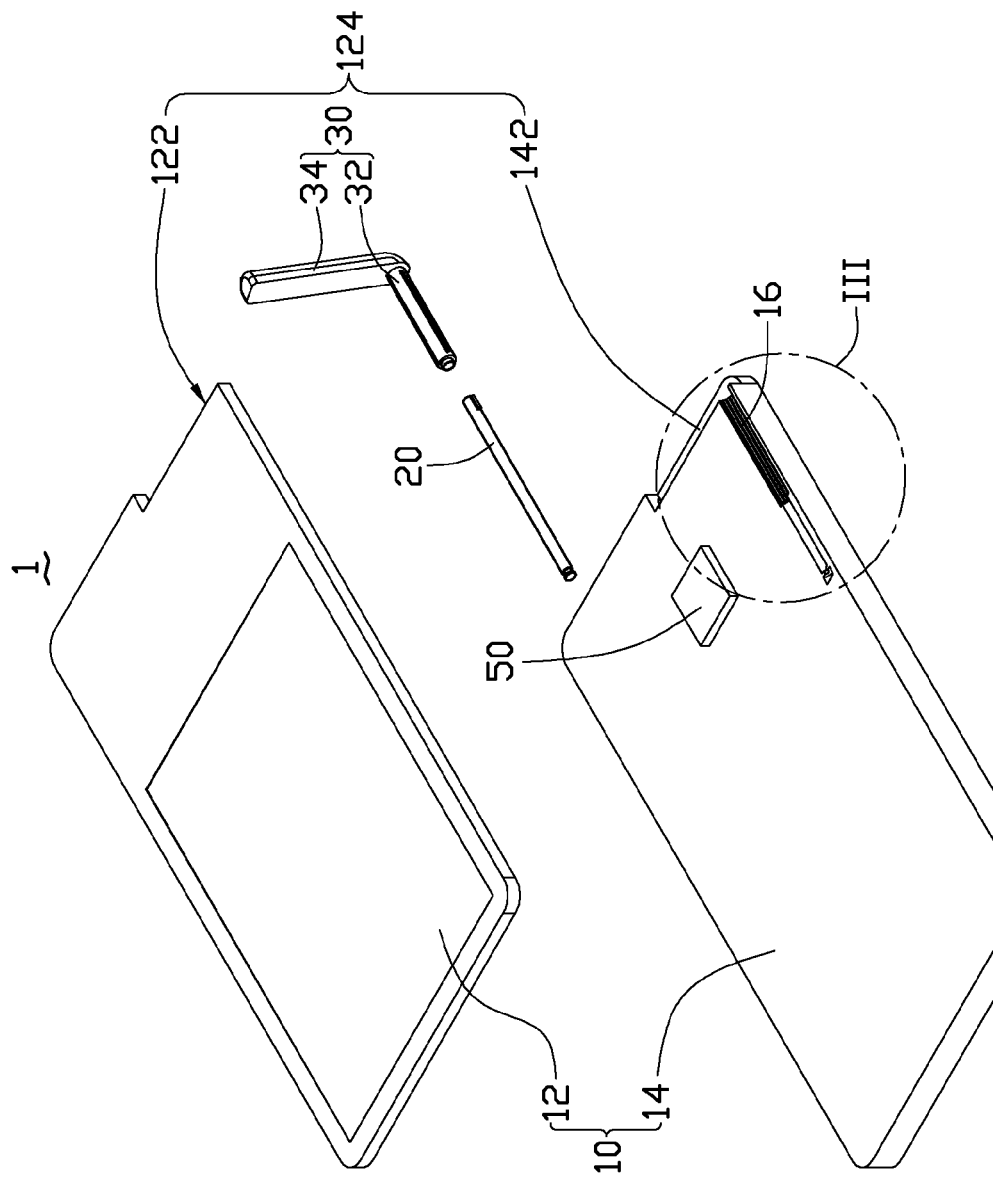
FIG. 2 is an exploded, perspective view of the electronic device of FIG. 1.

Referring to FIGS. 1-2, an embodiment of an electronic device 1 with a joystick is illustrated. The electronic device 1 includes a main body 10, a conductive post 20, and a joystick 30. The conductive post 20 is rotatably connected to the main body 10, and the joystick 30 is movably connected to the conductive post 20.

Figure 3:
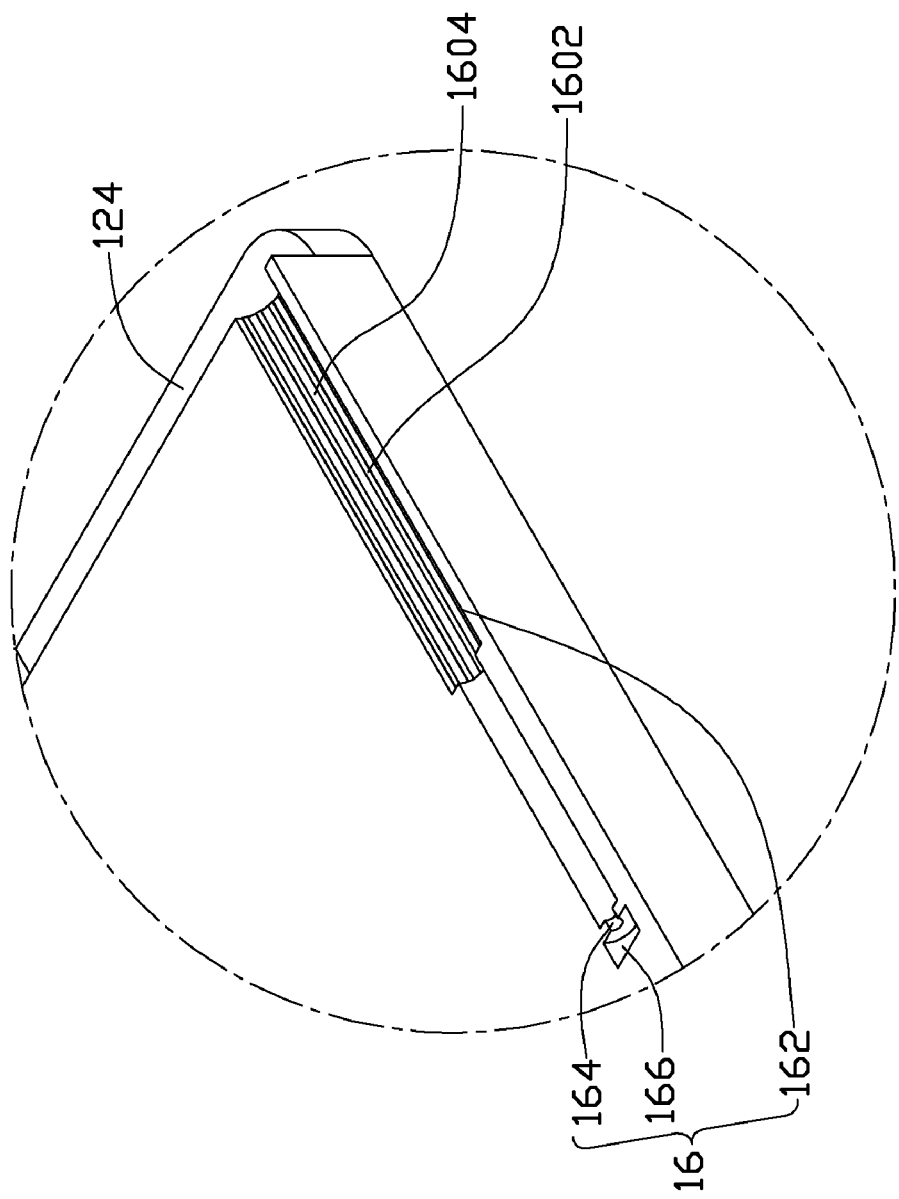
FIG. 3 is an enlarged, perspective view of a first receiving portion of the electronic device of FIG. 2.

Referring also to FIG. 3, the main body 10 includes a cover 12 and an elongate base 14. A first receiving portion 16 is formed along a longitudinal of the base 14. The first receiving portion 16 includes a first slot 162, a second slot 164, and a third slot 166. The first slot 162, the second slot 164, and the third slot 166 are generally half-cylindrical.

A plurality of insulating ribs 1602 protrudes out from the surface of the first slot 162, and each of the ribs 1602 extends along the longitudinal of the base 14. A fist conductive element 1604 is disposed between two adjacent ribs 1602. In the exemplary embodiment, each conductive element 1604 has a resistance value. The second slot 164 communicates with the first slot 162 and the third slot 166. The radius of the second slot 164 is less than that of the third slot 166.

A second receiving portion (not shown), corresponding to the first receiving portion 16, is formed along a longitudinal of the cover 12, and has the same configuration as the first receiving portion 16. The first receiving portion 16 and the second receiving portion cooperatively forms a first receiving space 18. The receiving space 18 is for receiving the conductive post 20 and the joystick 30.

A recessed portion 142 is formed along a transverse side, adjacent to the first receiving portion 16, of the base 14, and an opening 122 is formed along a transverse side of the cover 12, corresponding to the recessed portion 142. The recessed portion 142 and the opening 122 cooperatively form a second receiving space 124. The receiving spaces 18 and 124 cooperatively receive the joystick 30.

Figure 4:
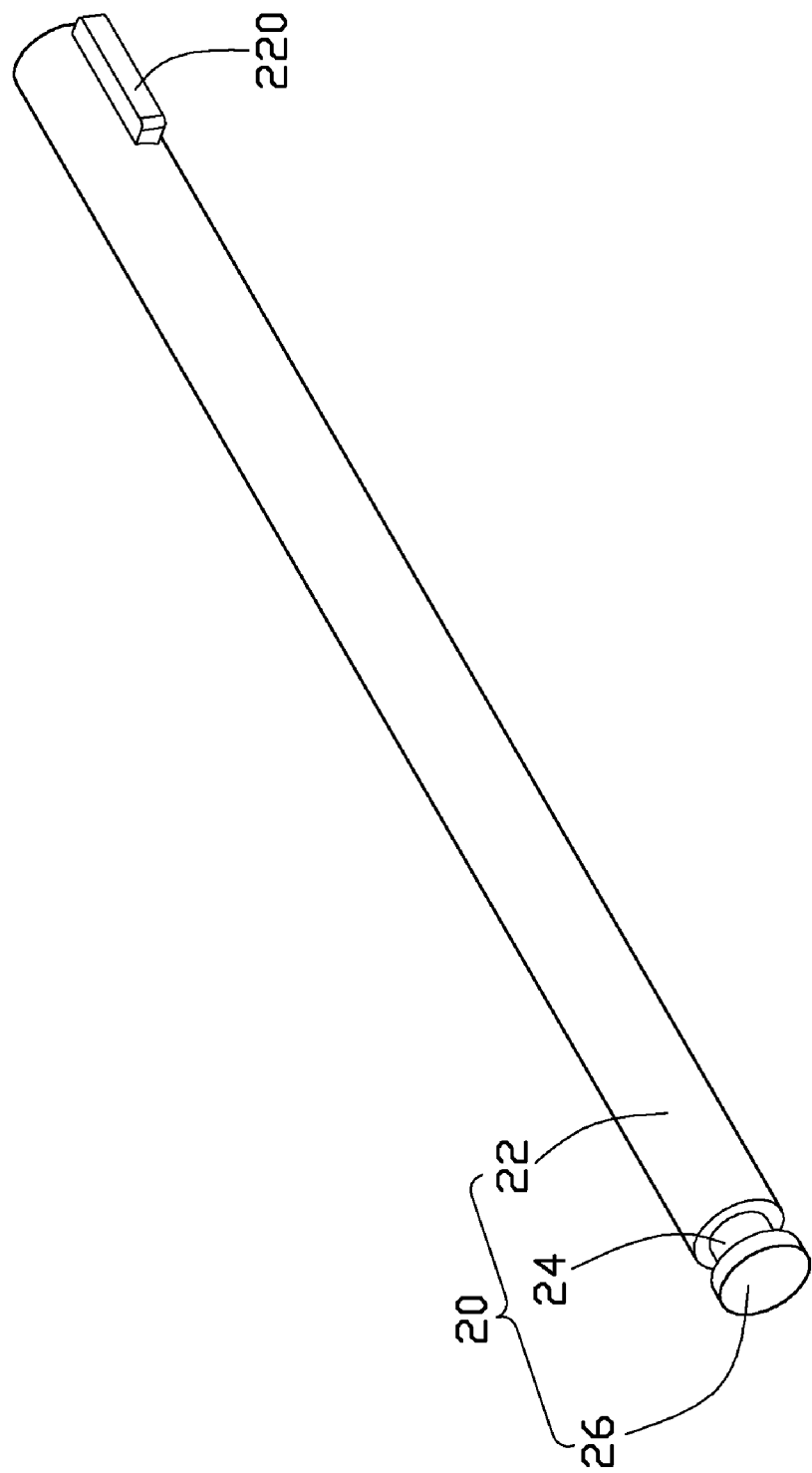
FIG. 4 is an isometric view of a conductive post of the electronic device of FIG. 2.
Figure 5:
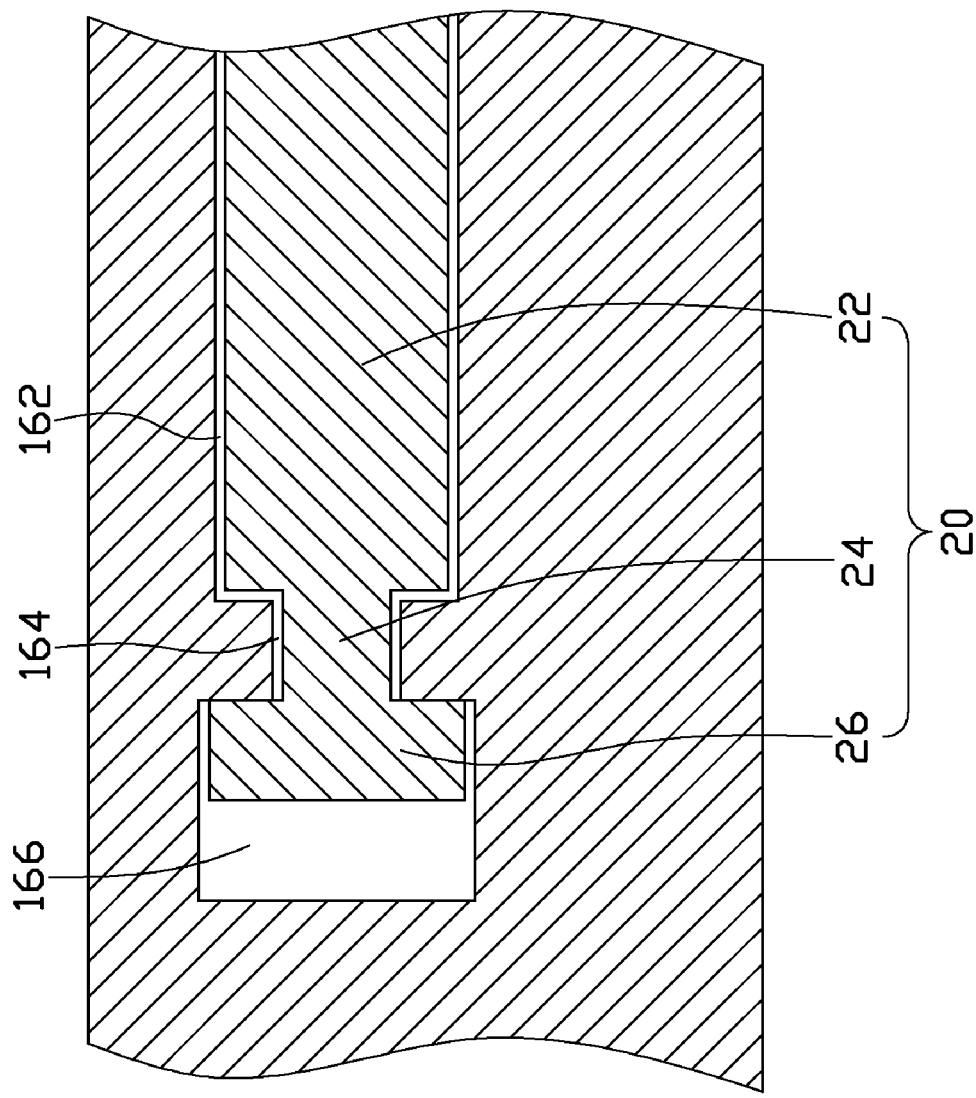
FIG. 5 is a partial, cross-sectional view of a conductive post and a first receiving portion of the electronic device of FIG. 2.
Figure 9:
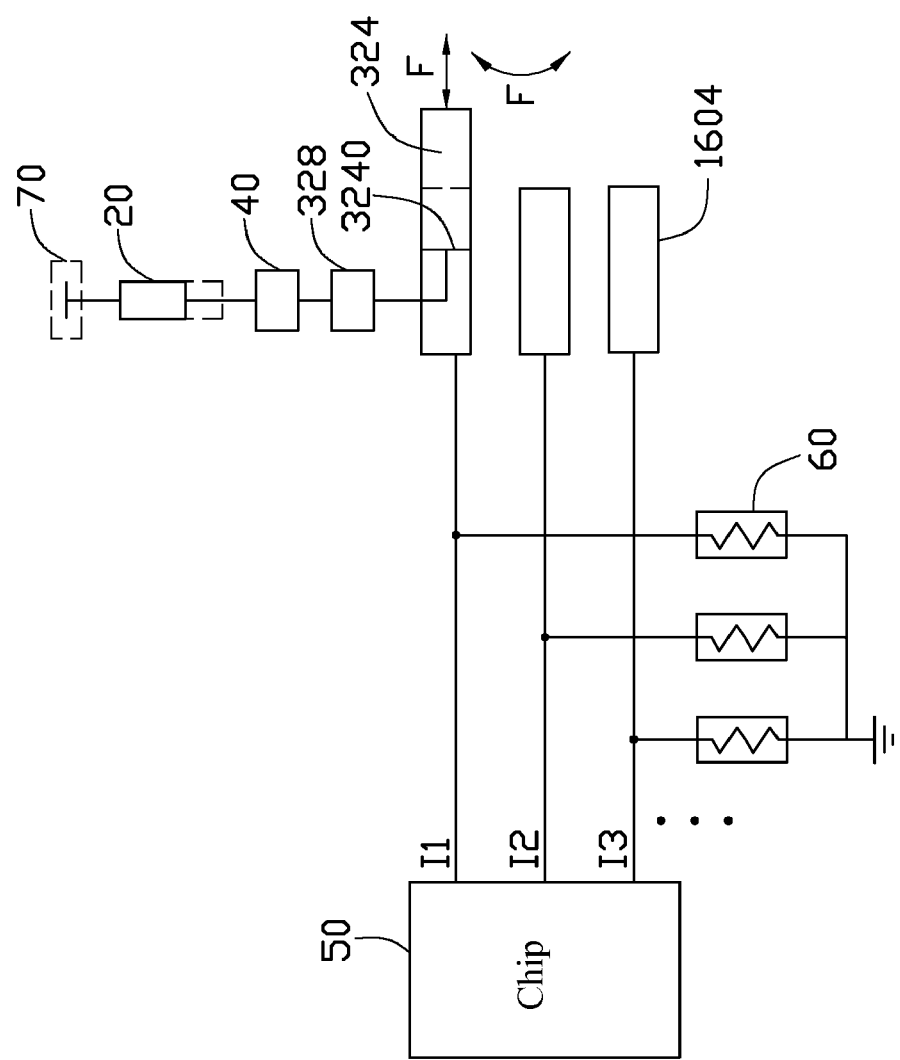
FIG. 9 is a control circuit diagram of the electronic device of FIG. 1.

Referring also to FIG. 4 and FIG. 5, the conductive post 20 is electrically connected to a direct current power source 70 (see FIG. 9). In the exemplary embodiment, the resistance value of the conductive post 20 is very small and negligible. The conductive post 20 includes a cylindrical body 22, a neck portion 24 and a head portion 16. An elastic projection 220 protrudes out from the surface of the body 22 from one end thereof. The radius of the neck portion 24 is less than that of the head portion 16 and the second slot 164. The radius of the head portion 26 is less than that of the third slot 166, but greater than that of the second slot 164.

Figure 6:
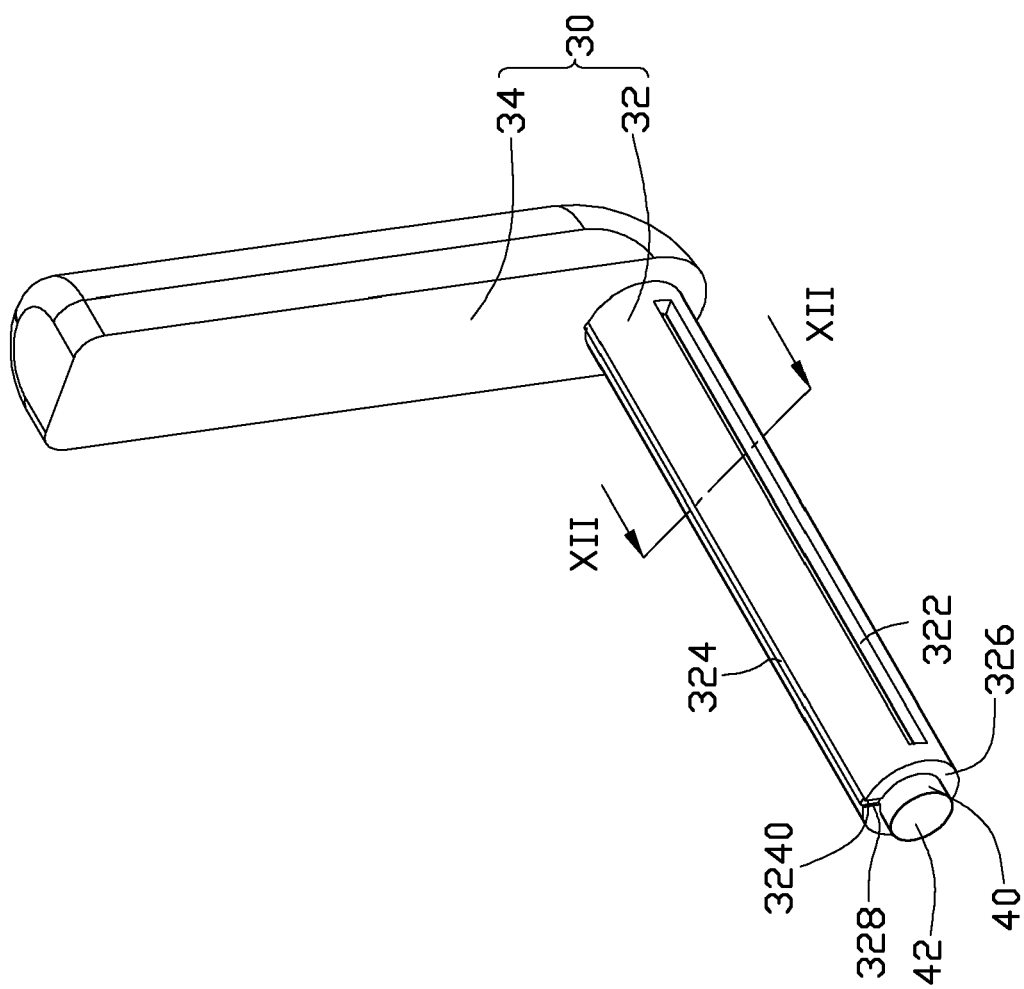
FIG. 6 is an isometric view of a joystick of the electronic device of FIG. 2.
Figure 7:
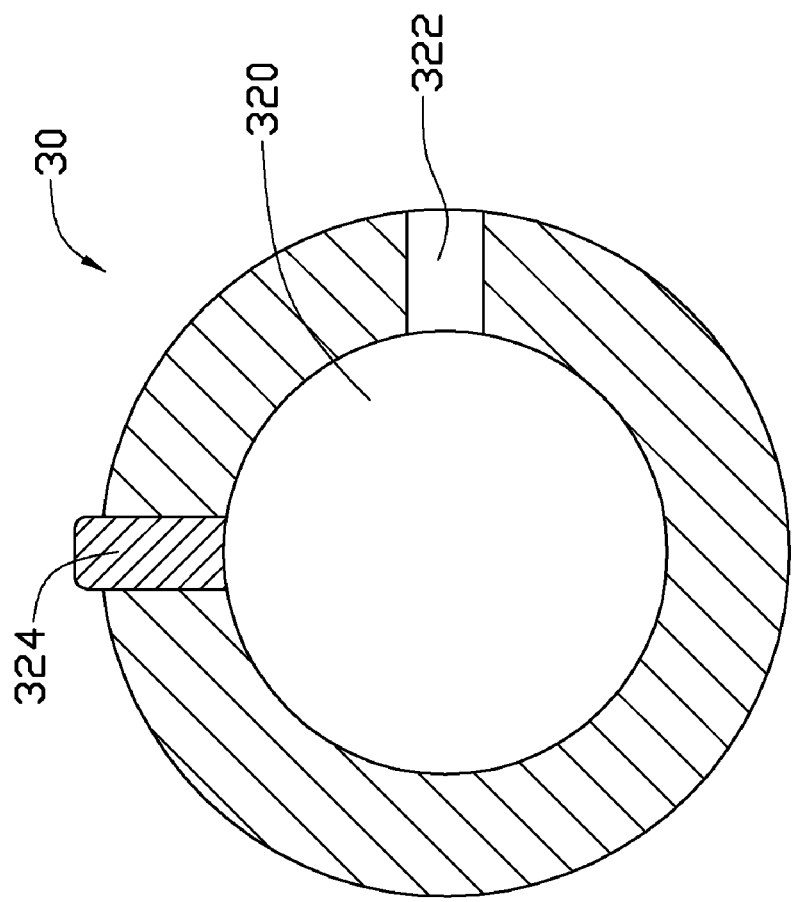
FIG. 7 is a cross-sectional of the joystick of the electronic device of FIG. 6, taken along the line XII-XII.

Referring also to FIG. 6 and FIG. 7, the joystick 30 includes a rotatable post 32 and a handle 34. The rotatable post 32 is generally cylindrical. A receiving hole 320 is defined in the rotatable post 32 and extends along the axis of the rotatable post 32. A sliding slot 322 is defined in the sidewall of the rotatable post 32 and extends along the axis of the rotatable post 32. The sliding slot 322 has two opposite ends. The receiving hole 320 communications with the sliding slot 322. A second conductive element 324 protrudes out from the sidewall of the rotatable post 32, and extends along the axis of the rotatable post 32.

A third conductive element 40 is attached to one end of the rotatable post 32. The third conductive element 40 is generally cylindrical, and a through hole 42 is defined in the conductive element 40. The through hole 42 communications with the receiving hole 320. A fourth conductive element 328 protrudes out from the end 326 of the rotatable post 32. The end 3240 of the second conductive element 324 is connected to the third conductive element 40 via the fourth conductive element 328.

The joystick 30 further includes a handle 34. The handle 34 is attached to another end of the rotatable post 32, and generally perpendicular to the rotatable post 32, thus it is convenient for users to operate the joystick 30. When the joystick 30 is not operated, the handle 34 can be put and received in the second receiving space 124.

Figure 8:
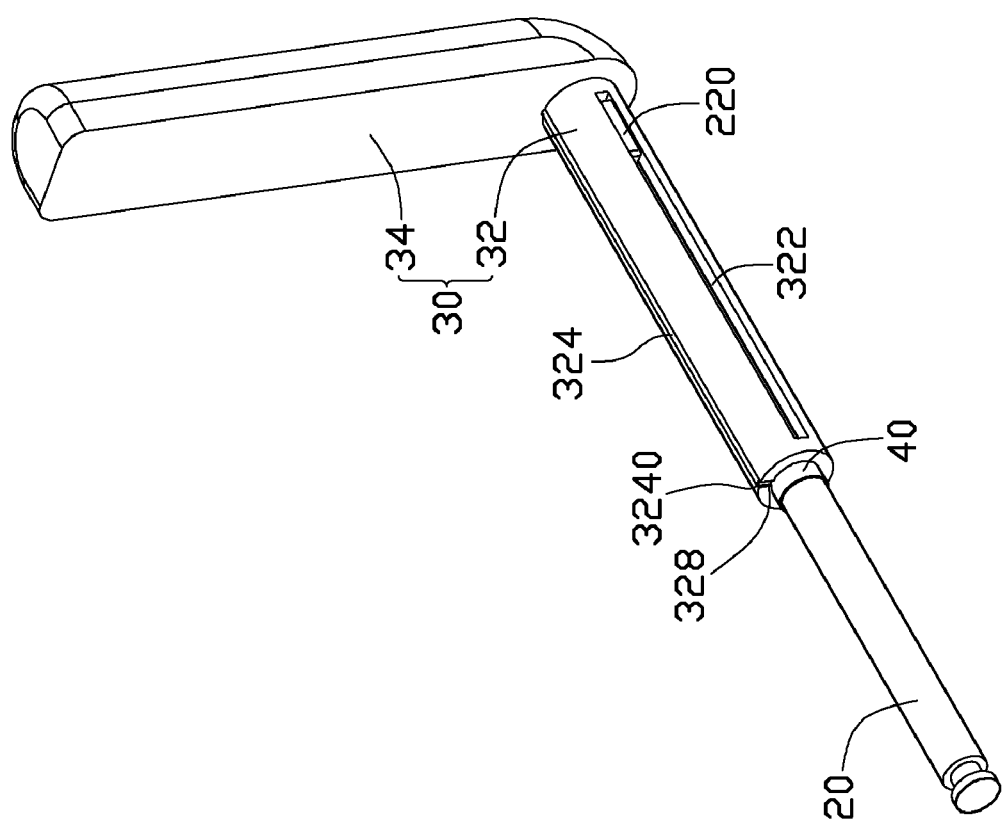
FIG. 8 is an isometric view of a conductive post and a joystick of the electronic device of FIG. 2.

Referring also to FIG. 8, in the exemplary embodiment, the head portion 26 of the conductive post 20 is received in the third slot 166, and the neck portion 24 of the conductive post 20 is received in the second slot 164. The radius of the head portion 26 is less than that of the third slot 166, but greater than that of the second slot 164, thus the head portion 26 cannot slide out from the third slot 166. The body 22 of the conductive post 20 can pass through the through hole 42 of the third conductive element 40 when the elastic projection 220 is in a deformed state. When the body 22 of the conductive post 20 is received in the receiving hole 320 of the rotatable post 30 and the elastic projection 220 is aligned with the sliding slot 322, the elastic projection 220 penetrates the sliding slot 322 and can slide along the sliding slot 322. When the elastic projection 220 slides along the sliding slot 322, the ends 3222 and 3224 of the sliding slot 322 resists the elastic projection 220, thus the conductive post 20 cannot be disengaged from the joystick 30.

Referring also to FIG. 9, the electronic device 1 further includes a chip 50. The chip 50 has a plurality of input pins. One end of each of the first conductive element 1604 is electrically connected to the ground via a resistor 60. The node between the first conductive element 1604 and the resistor 60 is electrically connected to one of the input pins of the chip 50.

When the second conductive element 324 does not contact with any of the first conductive element 1604, the voltage value of the pins connected to the first conductive elements 1604 are 0 volt.

When the rotatable post 32 is rotated, causing the second conductive element 3240 to contact with a portion of one of the first conductive elements 1604, the source 70, the conductive post 20, the third conductive element 40, the fourth conductive element 328, the end 3240 of the second conductive element 324, the remaining portion of the first conductive element 1604 which is not contacted by the second conductive element 324, and the resistor 60 connected to the first conductive element 1604 form a loop circuit. As the conductive post 20 is electrically connected to the direct current power source 70, the resistance value of the conductive post 20 is negligible, thus the voltage value of the loop circuit is invariable, and the voltage value of each of the pins connected to a first conductive element 324 is equal to the voltage value of the resistor 60 connected to the first conductive element 324.

The chip 50 detects the voltage value of the pins and executes predetermined functions according to the detected voltage value of the pins. In the exemplary embodiment, when the chip 50 detects the voltage value of one of the pins is a fixed value within a predetermined time interval, it executes a predetermined function accordingly.

After the second conductive element 324 contacts with a portion of one of the first conductive element 1604, the contact area between the second conductive element 324 and the first conductive element 1604 becomes larger if the rotatable post 32 is pushed along the axis of the first receiving space 18.

Therefore, the resistance value of the remaining potion of the first conductive element 1604 which is not contacted by the second conductive element 324 decreases, the voltage value of the resistor 60 connected to the first conductive element 1604 correspondingly increases, and the voltage value of the pin connected to the first conductive element 1604 also correspondingly increases. The chip 50 detects the change value of the pin and correspondingly executes a predetermined function, for example, turns up the volume of the electronic device 1.

After the second conductive element 324 contacts with a portion of one of the first conductive elements 1604, the contact area between the second conductive element 324 and the first conductive element 1604 becomes smaller if the rotatable post 32 is pulled along the axis of the first receiving space 18. Therefore, the resistance value of the remaining portion of the first conductive element 1604 which is not contacted by the second conductive element 324 increases, the voltage value of the resistor 60 connected to the first conductive element 1604 correspondingly decreases, and the voltage value of the pin connected to the first conductive element 1604 also correspondingly decreases. The chip 50 detects the change value of the pin and correspondingly executes a predetermined function, for example, turns down the volume of the electronic device 1.

It should be noted that if the second conductive element 324 is large enough, that is, when the rotatable post 20 is rotated, causing the second conductive element 324 to simultaneously contact with at least portion of two conductive elements 1604, the chip 50 detects the voltage value of the pins connected to the at least two conductive elements 1604 and executes a predetermined function according to the detected voltage value.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with a joystick, comprising:
a main body defining a first hollow receiving space, wherein a plurality of first conductive elements protrude out from the inner sidewall of the first receiving space and extend along the axis of the first receiving space, each of the first conductive elements has a resistance;
a plurality of resistors, wherein each of the first conductive elements is electrically grounded via one of the plurality of the resistors;
a chip comprising a plurality of input pins, wherein each of the pins is electrically connected to a node between a first conductive element and a resistor connected to the first conductive element;
a joystick comprising a rotatable post, wherein the rotatable post is received in the first receiving space; a second conductive element protrudes out from the sidewall of the rotatable post and extends along the axis of the rotatable post; the second conductive element is electrically connected to a direct current power source;
wherein when the joystick is rotated, causing the second conductive element to contact with a portion of one of the first conductive elements, a voltage value of the pin connected to the second conductive element is changed; the chip detects a change of the voltage value of the pins and executes corresponding functions according to the detected change of the voltage value of the pins.

2. The electronic device as described in claim 1, wherein when the chip detects the voltage value of one of the pins is a fixed value with a predetermined time interval, the chip executes a predetermined function.

3. The electronic device as described in claim 1, wherein the first receiving space comprises a first slot, a second slot, and a third slot; the second slot communicates with the first slot and the third slot.

4. The electronic device as described in claim 3, wherein a plurality of insulating ribs protrude out from the first slot; and each first conductive element is disposed between two insulated ribs.

5. The electronic device as described in claim 3, wherein the radius of the second slot is less than that of the third slot.

6. The electronic device as described in claim 5, further comprising a conductive post, wherein the conductive post comprises a neck portion and a head portion; the neck portion is received in the second slot, and the head portion is received in the third portion; and the radius of the head portion is greater than that of the second slot; and the rotatable post is moveably connected to the conductive post.

7. The electronic device as described in claim 6, wherein an elastic projection protrudes out from the sidewall of the conductive post; a receiving hole is defined in the rotatable post and extends along the axis of the rotatable post; a sliding slot is formed along the axis of the rotatable post, the sliding slot comprises two opposite ends; the conductive post is received in the receiving hole of the rotatable post, and the elastic projection penetrates through the sliding slot.

8. The electronic device as described in claim 7, further comprising a third conductive element and a fourth conductive element; wherein the third conductive element is attached to one end of the rotatable post, and comprises a through hole communicating with the receiving hole of the rotatable post; the fourth conductive element protrudes out from the end of the rotatable post; and the second conductive element is electrically connected to the fourth conductive element via the fourth conductive element.

9. The electronic device as described in claim 8, wherein the conductive post is electrically connected to the direct current power source, and the resistance value of the conductive post is negligible.

10. The electronic device as described in claim 1, wherein the joystick further comprises a handle, the handle is attached to one end of the rotatable post.

11. The electronic device as described in claim 10, wherein a second receiving space is defined in the main body, the second receiving space is for receiving the handle.

* * * * *